US011999625B2

United States Patent
Liu et al.

(10) Patent No.: US 11,999,625 B2
(45) Date of Patent: Jun. 4, 2024

(54) METHOD OF PRODUCING LAYERED SILICATE, AND APPLICATION THEREOF IN PRODUCTION OF SILICA NANOSHEET AND SO ON

(71) Applicant: Nissan Chemical Corporation, Tokyo (JP)

(72) Inventors: Jiahao Liu, Sodegaura (JP); Hirotake Kitagawa, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/274,953

(22) PCT Filed: Feb. 15, 2023

(86) PCT No.: PCT/JP2023/005176
§ 371 (c)(1),
(2) Date: Jul. 28, 2023

(87) PCT Pub. No.: WO2023/188930
PCT Pub. Date: Oct. 5, 2023

(65) Prior Publication Data
US 2024/0051834 A1    Feb. 15, 2024

(30) Foreign Application Priority Data

Mar. 29, 2022   (JP) .................. 2022-053848

(51) Int. Cl.
*C01B 33/113*   (2006.01)
*B82Y 40/00*    (2011.01)
*C01B 33/44*    (2006.01)

(52) U.S. Cl.
CPC ............ *C01B 33/113* (2013.01); *C01B 33/44* (2013.01); *B82Y 40/00* (2013.01)

(58) Field of Classification Search
None
See application file for complete search history.

(56) References Cited

U.S. PATENT DOCUMENTS

| 4,689,207 A | 8/1987 | Zones |
| 2006/0105903 A1 | 5/2006 | Tatsumi et al. |

(Continued)

FOREIGN PATENT DOCUMENTS

| CN | 100368290 C | 2/2008 |
| CN | 101967230 A | 2/2011 |

(Continued)

OTHER PUBLICATIONS

Handke et al ("Siloxane and silsequioxane molecules—Precursors for silicate materials", Spectrochimica Acta Part A: Molecular and Biomolecular Spectroscopy, vol. 79, Issue 4, (2011), pp. 749-757) (Year: 2011).*

(Continued)

*Primary Examiner* — Colin W. Slifka
*Assistant Examiner* — Michael Forrest
(74) *Attorney, Agent, or Firm* — Birch, Stewart, Kolasch & Birch, LLP

(57) ABSTRACT

Provided is a method capable of easily producing a layered silicate in a short time. The problem may be solved by a method of producing a layered silicate, including the following steps (a) and (b):

(a) providing a cage silicate that contains an anion component represented by formula (1) below and a cation component represented by formula (2) below with a ratio of the mole number of water to the mole number of the anion component in terms of $SiO_2$, ($H_2O/SiO_2$), of 0.7 to 30;

(Continued)

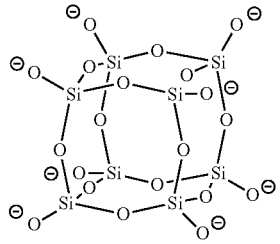

formula (1)

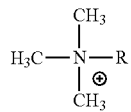

formula (2)

(in formula (2), R represents an alkyl group having 2 to 9 carbon atoms)

and (b) treating the cage silicate obtained in step (a) in an autoclave.

20 Claims, 9 Drawing Sheets

(56) References Cited

U.S. PATENT DOCUMENTS

| | | |
|---|---|---|
| 2008/0253953 A1 | 10/2008 | Muller et al. |
| 2008/0311750 A1 | 12/2008 | Izumi et al. |
| 2012/0203019 A1 | 8/2012 | Loessel et al. |
| 2014/0127113 A1 | 5/2014 | Sasaki et al. |
| 2016/0068664 A1 | 3/2016 | Suemura et al. |
| 2019/0232252 A1 | 8/2019 | Skinley et al. |
| 2021/0101800 A1 | 4/2021 | Feyen et al. |

FOREIGN PATENT DOCUMENTS

| | | |
|---|---|---|
| CN | 101974225 A | 2/2011 |
| CN | 102574873 A | 7/2012 |
| CN | 103803563 A | 5/2014 |
| JP | 7-196313 A | 8/1995 |
| JP | 2000-334881 A | 12/2000 |
| JP | 2008-63228 A | 3/2008 |
| JP | 2009-511409 A | 3/2009 |
| JP | 2009-269820 A | 11/2009 |
| JP | 2013-40066 A | 2/2013 |
| JP | 2017-512132 A | 5/2017 |
| JP | 2021-514342 A | 6/2021 |
| WO | WO2014/188934 A1 | 11/2014 |

OTHER PUBLICATIONS

English translation of the Written Opinion of the International Searching Authority for International Application No. PCT/JP2023/005176, dated Apr. 25, 2023.
International Search Report for PCT/JP2023/005176 dated Apr. 25, 2023.
Miller et al., "Synthesis, characterization and structure solution of ULS-1 IETMA$_8$(H$_2$O)$_{20}$|[Si$_{24}$O$_{48}$(OH)$_8$], a layered silicate composed of half-sodalite cages", Microporous and Mesoporous Materials, 2015, vol. 202, pp. 250-258.
Moteki et al., "Role of Acidic Pretreatment of Layered Silicate RUB-15 in Its Topotactic Conversion into Pure Silica Sodalite", Chemistry of Materials, 2011, vol. 23, pp. 3564-3570.
Written Opinion of the International Searching Authority for PCT/JP2023/005176 dated Apr. 25, 2023.
Office Action issued Dec. 19, 2023, in Taiwanese Patent Application No. 112107486.
Extended European Search Report for corresponding European Application No. 23744034.2, dated Mar. 1, 2024.
Li et al., "A New Layered Silicate with Structural Motives of Silicate Zeolites: Synthesis, Crystals Structure, and Properties," Chem. Mater., vol. 20, 2008, pp. 1896-1901.
Harrison, P. G., "Silicate cages: precursors to new materials," Journal of Organometallic Chemistry (1997), vol. 542, pp. 141-183.
Office Action issued Mar. 8, 2004, in Chinese Patent Application No. 202380009820.4.

* cited by examiner (a)

(b)

(c)

FIG.1-2
(d)
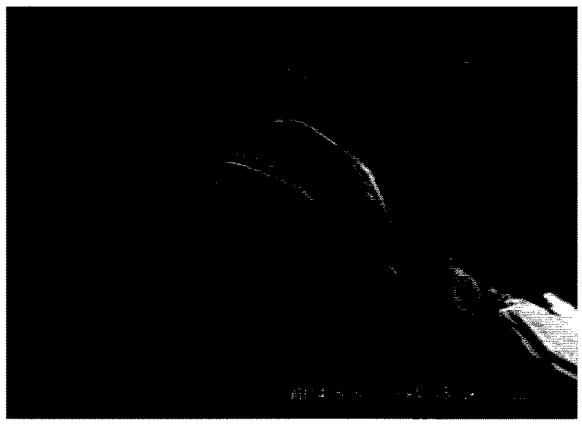
(e)
(f)

(a) – (f)

(g)

FIG.3-1
(a)
(b)
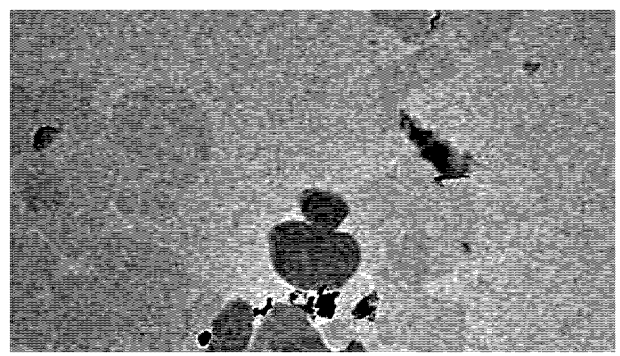

(c)

(d)

METHOD OF PRODUCING LAYERED SILICATE, AND APPLICATION THEREOF IN PRODUCTION OF SILICA NANOSHEET AND SO ON

TECHNICAL FIELD

The present invention relates to a method of producing a layered silicate, and an applications of the layered silicate obtained by the production method, and more specifically to a production method by which the layered silicate is obtainable more easily in a shorter time than by conventional method, and applications of the obtained layered silicate to production of a silica nanosheet and so on.

BACKGROUND ART

Layered silicate is a regularly structured compound having silica layers and cation intercalated in between, and thus has attracted attention as catalyst, adsorbent, precursor of zeolite and so on.

For example, Patent Literature 1 discloses a method of obtaining a layered silicate having the RUB-39 structure, by mixing pyrolytic silica and dimethyldipropylammonium hydroxide, adding thereto zeolite which serves as a seed crystal of a silicate, and holding the mixture in an autoclave vessel at 150° C. for 84 to 252 hours.

Also, Patent Literature 2 discloses a method of obtaining a layered silicate having the RUB-56 structure, by adding dropwise an aqueous $NH_4F$ solution to tetraethoxysilane solution in ethanol, heating them at 500° C. for 5 days to synthesize a hydrous gel, adding the hydrous gel to a diethyldimethylammonium hydroxide solution, and holding the mixture in an autoclave vessel at 140° C. for 48 hours.

Furthermore, Non-Patent Literature 1, for example, discloses a method of obtaining a layered silicate having the RUB-15 structure, by mixing tetraethoxysilane and tetramethylammonium hydroxide, and holding the obtained crystal in an autoclave vessel at 150° C. for 7 days.

In addition, Non-Patent Literature 2 discloses a method of obtaining a layered silicate having the ULS-1 structure, by dissolving aluminum hydroxide in ethyltrimethylammonium hydroxide, adding thereto 1,4-bismethylpyrrolidinium butane dibromide and colloidal silica, further adding thereto lithium hydroxide, and holding the mixture at 100° C. for 5 to 7 months.

CITATION LIST

Patent Literature

PATENT LITERATURE 1: JP-A-2009-511409
PATENT LITERATURE 2: JP-A-2021-514342

Non-Patent Literature

NON-PATENT LITERATURE 1: Takahiko Moteki et al., Chemistry of materials, 2011, vol. 23, p. 3564-3570
NON-PATENT LITERATURE 2: Mark A. Miller et al., Microporous and Mesoporous Materials, 2015, vol. 202, p. 250-258

SUMMARY OF INVENTION

Technical Problem

The conventional methods of producing the layered silicate have, however, limitations that the layered silicate needs a long time for synthesis even if a seed crystal such as zeolite were used for the growth up to the layered form, that a specialized raw material such as hydrous gel, if used, again needs a long time for the synthesis thereof, and so on.

A long time has also been spent in the synthesis of the layered silicate with use of colloidal silica as a Si source.

The present invention has been made considering the limitations and problems of the prior art, and an object thereof is to provide a method capable of easily producing the layered silicate in a short time.

Solution to Problem

After intensive studies aimed at solving the above problems, the present inventors have found that a layered silicate is easily obtainable by an autoclave step in a short time, by using a cage silicate as a raw material, with the water content of the cage silicate being within a predetermined range and have completed the present invention.

That is, the present invention relates to:

[1]

a method of producing a layered silicate, which includes steps (a) and (b) below:

(a) providing a cage silicate that contains an anion component represented by formula (1) below and a cation component represented by formula (2) below with a ratio of the mole number of water to the mole number of the anion component in terms of $SiO_2$, ($H_2O/SiO_2$), of 0.7 to 30;

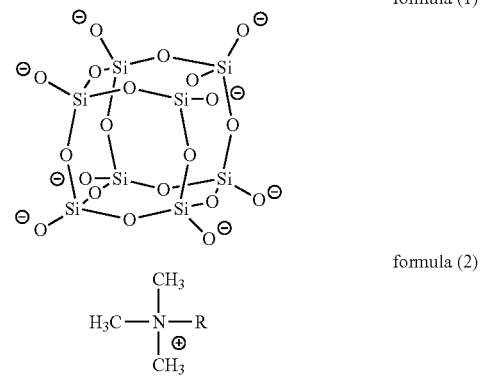

formula (1)

formula (2)

(in formula (2), R represents an alkyl group having 2 to 9 carbon atoms.)

and (b) treating the cage silicate obtained in step (a) in an autoclave.

Each of items [2] to below corresponds to an aspect or a preferred embodiment of the present invention.

[2]

The method of producing a layered silicate according to [1], wherein the ratio of the mole number of water to the mole number of the anion component in terms of $SiO_2$, ($H_2O/SiO_2$), in the cage silicate provided in step (a) is 1.5 to 15.0.

[3]

The method of producing a layered silicate according to [1] or [2], wherein, in step (a), the cage silicate is kept under vacuum or reduced pressure at a temperature of 20° C. or higher and lower than 80° C. for 30 minutes or longer and 10 hours or shorter to remove water.

[4]

The method of producing a layered silicate according to any one of [1] to [3], wherein the ratio of the mole number of the cation component represented by formula (2) in terms of quaternary ammonium to the mole number of the anion component in terms of $SiO_2$, (quaternary ammonium/$SiO_2$), in the cage silicate provided in step (a) is 0.7 to 1.5.

[5]

The method of producing a layered silicate according to any one of [1] to [4], wherein the treatment in the autoclave in step (b) takes place in a pressure vessel at a temperature of 80° C. or higher and lower than 300° C.

[6]

The method of producing a layered silicate according to any one of [1] to [5], further comprising step (c) below prior to step (a):

(c) mixing activated silicic acid and a quaternary ammonium to crystallize a cage silicate from the mixed solution.

[7]

The method of producing a layered silicate according to [6], wherein the activated silicic acid is obtained by removing a cation from an alkali silicate solution obtained by dissolving an anhydrous alkali silicate.

[8]

A method of producing a silica nanosheet, the method comprising contacting the layered silicate obtained by the production method according to any one of claims [1] to [7] with a hydrophilic medium.

[9]

The method of producing a silica nanosheet according to [8], wherein the contacting is carried out at a ratio of 0.1 parts by mass to 15 parts by mass of the layered silicate to 100 parts by mass of the hydrophilic medium.

[10]

The method of producing a silica nanosheet according to [8] or [9], wherein the hydrophilic medium is water, an organic solvent, or a mixture thereof.

[11]

A method of producing a silica nanosheet dispersion, the method comprising contacting the layered silicate obtained by the production method according to any one of [1] to [7] with a hydrophilic medium.

Advantageous Effects of Invention

The method of producing a layered silicate of the present invention can solve the restrictions or problems of the conventional technique, by using a cage silicate as a raw material, and can easily produce a layered silicate in a short time, demonstrating a remarkable technical effect which is highly valuable in practice.

The layered silicate obtained by the production method according to an embodiment of the present invention can produce a silica nanosheet as a result of contact with an aqueous medium, and can provide high technical value not only for its wide versatility, for example, to catalyst or adsorbent, but also as a raw material of silica nanosheet and so on.

BRIEF DESCRIPTION OF DRAWINGS

FIG. 1-2 each represent a scanning electron microscope image of a layered silicate according to an Example of the present invention.

FIG. 2 each represent a powder X-ray diffraction pattern of a layered silicate according to an Example of the present invention or a Comparative Example.

FIG. 3-1 each represent a transmission electron microscope image of a silica nanosheet obtained from a layered silicate according to an Example of the present invention.

FIG. 3-2 each represent a transmission electron microscope image of a silica nanosheet obtained from a layered silicate according to an Example of the present invention.

FIG. 4-1 represents an atomic force microscope (AFM) image and a profile of a silica nanosheet obtained from the layered silicate according to an Example of the present invention.

FIG. 4-2 represents an atomic force microscope (AFM) image and a profile of a silica nanosheet obtained from a layered silicate according to an Example of the present invention.

FIG. 4-3 represents an atomic force microscope (AFM) image and a profile of a silica nanosheet obtained from a layered silicate according to an Example of the present invention.

FIG. 4-4 represents an atomic force microscope (AFM) image and a profile of a silica nanosheet obtained from a layered silicate according to an Example of the present invention.

DESCRIPTION OF EMBODIMENTS

Figure 1:
FIG. 1-1 each represent a scanning electron microscope image of a layered silicate according to an Example of the present invention.
Figure 1:
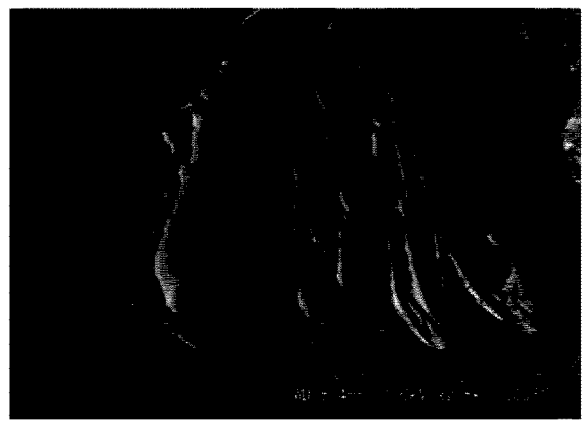
Figure 1:
Figure 1:
Figure 1:
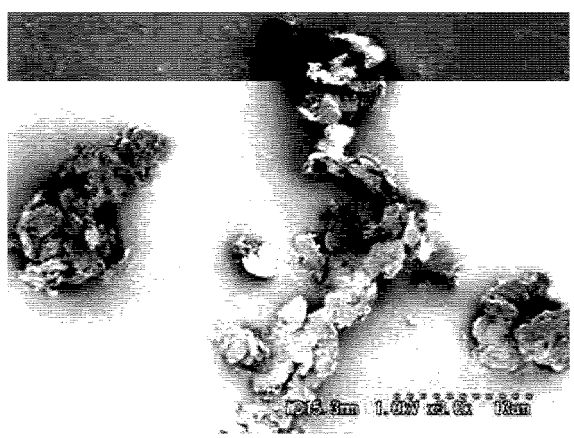
Figure 1:
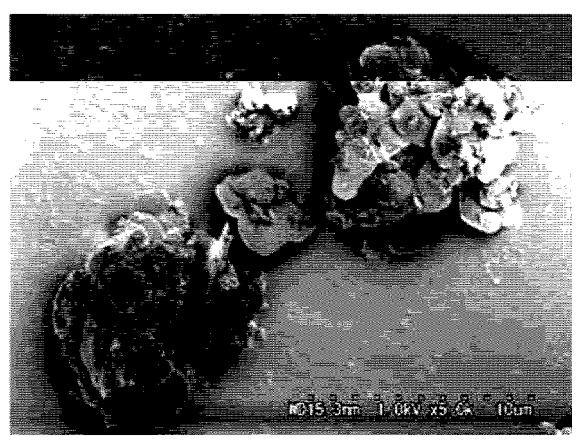

The present invention relates to a method of producing a layered silicate including the following steps (a) and (b):

(a) providing a cage silicate that contains an anion component represented by formula (1) below and a cation component represented by formula (2) below with a ratio of the mole number of water to the mole number of the anion component in terms of $SiO_2$, ($H_2O/SiO_2$), of 0.7 to 30;

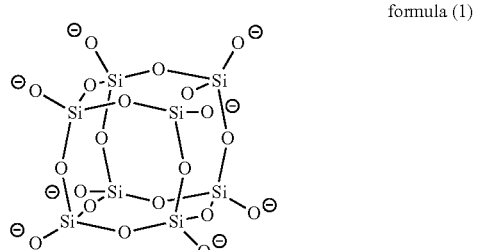

formula (1)

formula (2)

(in formula (2), R represents an alkyl group having 2 to 9 carbon atoms.)

and (b) treating the cage silicate obtained in step (a) in an autoclave.

As described above, the method for producing a layered silicate of the present invention includes step (a) of providing a specific cage silicate, and step (b) of treating the cage silicate obtained in step (a) in an autoclave. Hence, the method of producing a layered silicate of the present invention may include only steps (a) and (b) described above, or may include, in addition to steps (a) and (b) described above, other step such as later-described step (c) of mixing activated silicic acid and a quaternary ammonium to crystallize the cage silicate from the mixed solution.

The step other than steps (a) and (b) may be carried out prior to steps (a) and (b), or subsequent to steps (a) and (b), or between steps (a) and (b). For example, step (c) of mixing activated silicic acid and a quaternary ammonium to crystallize a cage silicate from the mixed solution is carried out prior to steps (a) and (b).

<Step (a)>

The cage silicate provided in step (a) contains an anion component represented by formula (1) below and a cation component represented by formula (2) below with a ratio of the mole number of water to the mole number of the anion component in terms of $SiO_2$, ($H_2O/SiO_2$), of 0.7 to 30.

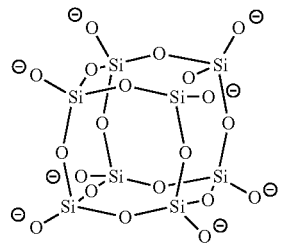

formula (1)

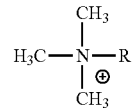

formula (2)

(in formula (2), R represents an alkyl group having 2 to 9 carbon atoms.)

The anion component represented by formula (1) is a cage silicate ion having a siloxane (Si—O—Si) bond as a basic skeleton.

The cation component represented by formula (2) is a quaternary ammonium ion, which is exemplified by ethyltrimethylammonium ion, propyltrimethylammonium ion, butyltrimethylammonium ion, pentyltrimethylammonium ion, hexyltrimethylammonium ion, heptyltrimethylammonium ion, octyltrimethylammonium ion, nonyltrimethylammonium ion and so on. In particular, ethyltrimethylammonium ion, propyltrimethylammonium ion, butyltrimethylammonium ion, pentyltrimethylammonium ion, hexyltrimethylammonium ion, heptyltrimethylammonium ion, and octyltrimethylammonium ion are preferred.

The cage geometry of the silicate compound may be identified by solid $^{29}Si$-NMR spectrometry. More specifically, the structure may be identified by assessing the bonding state of Si, according to the cross polarization magic angle spinning (CP-MAS) method in solid $^{29}Si$-NMR spectrometry. The Si atoms that constitute the cage silicate have the Q3 structure in which each Si atom is bound to one OH group and three O atoms, as illustrated by the aforementioned formula (1) and by formula (3) below. According to the CP-MAS method in solid $^{29}Si$-NMR spectrometry, peaks attributable to the Q3 structure appear at around −92 ppm to −100 ppm, and therefore the product may be identified to have the cage structure if all of the observed peaks are those appear at around −92 ppm to −100 ppm attributable to the Q3 structure.

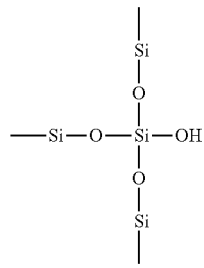

formula (3)

The ratio of the mole number of water to the mole number of the anion component in the cage silicate in terms of $SiO_2$, ($H_2O/SiO_2$), may be determined by measuring water (adsorbed water or hydrated water) content and $SiO_2$ concentration in the cage silicate.

The water content (mass) may be determined by quantifying the quaternary ammonium content and silicon dioxide content in the cage silicate, and by subtracting these masses from the mass of the cage silicate, from which the mole number of water is calculable.

The quaternary ammonium content may be determined by quantifying the nitrogen content with use of an elemental analyzer and converting the quantitative value to the quaternary ammonium content.

The silicon dioxide content may be determined by the calcination method.

More specifically, they may be determined by the method described in EXAMPLES of the present application.

In step (a), there is provided the cage silicate whose ratio of the mole number of water to the mole number of the anion component contained therein in terms of $SiO_2$, ($H_2O/SiO_2$), is 0.7 to 30.

With the ratio ($H_2O/SiO_2$) of the cage silicate provided in step (a) of 0.7 to 30, the layered silicate now becomes easily produced in a short time by a joint contribution with step (b) described later, demonstrating a remarkable technical effect such as enabling cost reduction.

The ratio ($H_2O/SiO_2$) of the cage silicate provided in step (a) is preferably from 1.5 to 15.0, and preferably from 1.5 to 12.0 in particular.

Means for providing the cage silicate having a ratio ($H_2O/SiO_2$) of 0.7 to 30 is not particularly limited, and hence a cage silicate having a ratio ($H_2O/SiO_2$) of 0.7 to 30 may be synthesized or obtained and used as it is, or a cage silicate synthesized or obtained may have the water content adjusted, so that the ratio ($H_2O/SiO_2$) falls within the range of from 0.7 to 30. From the viewpoint of conducting step (a) in an industrially stable manner and so on, the cage silicate preferably has the water content adjusted, so that the ratio ($H_2O/SiO_2$) falls within the range of 0.7 to 30.

The cage silicate may be synthesized by any of known methods. For example, the cage silicate may be synthesized by hydrolyzing tetraethoxysilane in the presence of a quaternary ammonium. The cage silicate may alternatively be synthesized in step (c) as described later, in which activated silicic acid and a quaternary ammonium are mixed, and the cage silicate is crystallized from the mixed solution.

Although no particular limitation is applied to the method for controlling the water content of the case silicate, the water content of the cage silicate is controllable by removing water from the cage silicate as synthesized, obtained or the like.

The water may be removed from the cage silicate under vacuum or reduced pressure, at a temperature of 20° C. or higher and lower than 80° C. The water is removable by, for example, holding the cage silicate in a vacuum dryer set at a degree of vacuum of from $5.0 \times 10^{-2}$ Pa to 500 Pa, at a predetermined temperature. In particular, water is removed preferably at $5.0 \times 10^{-2}$ Pa to 100 Pa, for efficient removal. The holding temperature may be 20° C. or higher and lower than 80° C., and is preferably 40° C. or higher and lower than 70° C. in particular. The cage silicate may be held at a constant temperature, or at temperatures varied in two steps or three steps.

The holding time may be 30 minutes or longer and 10 hours or shorter. A holding time of 1 hour or longer and 6 hours or shorter is particularly preferred. The holding time is preferably 30 minutes or longer since the water is suitably removable by drying for 30 minutes or longer. A holding time of 10 hours or shorter is efficient, since a holding time over 10 hours, although possible, may degrade the effect of removal of water after the water content reached a plateau.

In the cage silicate provided in step (a), the ratio of the mole number of the cation component represented by formula (2) in terms of quaternary ammonium to the mole number of the anion component in terms of $SiO_2$, (quaternary ammonium/$SiO_2$), is preferably 0.7 to 1.5.

With the ratio (quaternary ammonium/$SiO_2$) of 0.7 to 1.5, the cage silicate is preferred from the viewpoint that it is relatively easy to produce, that it is advantageously applicable, for example, to a later-described method capable of suppressing production of alcohol, and so on.

The ratio (quaternary ammonium/$SiO_2$) of 0.7 to 1.5 is preferable also from the viewpoint that the layered morphology will be more easily obtainable in the production of the layered silicate.

The ratio of the mole number of the cation component represented by formula (2) in terms of quaternary ammonium to the mole number of the anion component in terms of $SiO_2$, (quaternary ammonium/$SiO_2$), in the cage silicate may be determined by measuring the quaternary ammonium content and $SiO_2$ concentration in the cage silicate.

The quaternary ammonium content may be measured by any of known methods which are exemplified by gas chromatography, ion chromatography, and elemental analysis. More specifically, the quaternary ammonium content may be measured by a method described in EXAMPLES of the present application.

The method of measuring the $SiO_2$ concentration is as described previously, in relation to the method for measuring the ratio ($H_2O/SiO_2$).

Although the ratio of the mole number of the cation component represented by formula (2) in terms of quaternary ammonium to the mole number of the anion component in terms of $SiO_2$, (quaternary ammonium/$SiO_2$), in the cage silicate is preferably 0.7 to 1.5 as described above, the cage silicate used here is particularly preferred to have the ratio of 0.8 to 1.3.

By removing water from the cage silicate, or a procedure like that, in step (a) to more finely control the ratio of the mole number of water to the mole number of the anion component in terms of $SiO_2$, ($H_2O/SiO_2$), of the cage silicate, it is possible obtain a layered silicate having a different crystal structure after going through step (b).

In particular, by removing water from the cage silicate, or a procedure like that, to have the ratio of the mole number of water to the mole number of the anion component in terms of $SiO_2$, ($H_2O/SiO_2$), of the cage silicate be 3.6 or larger and smaller than 7.0, it is possible to obtain a layered silicate having the ULS-1 structure after going through step (b). From the viewpoint of obtaining the layered silicate having the ULS-1 structure, the ratio ($H_2O/SiO_2$) is preferably 3.6 or larger and smaller than 5.0 in particular.

By removing water from the cage silicate, or a procedure like that, to have the ratio of the mole number of water to the mole number of the anion component in terms of $SiO_2$, ($H_2O/SiO_2$), of the cage silicate to be 1.5 or larger and smaller than 3.6, or, 5.0 or larger and smaller than 12.0, it is also possible to obtain a layered silicate having a novel crystal structure. From the viewpoint of obtaining the layered silicate having the novel crystal structure, the ratio ($H_2O/SiO_2$) is particularly preferably 3.0 or larger and smaller than 3.6 or 8.5 or larger and smaller than 11.0.

The layered silicate having the novel crystal structure obtainable with the mole ratio ($H_2O/SiO_2$) of 1.5 or larger and smaller than 3.6 or 5.0 or larger and smaller than 12.0 (hereinafter, also referred to as "layered silicate A") is characterized by a powder X-ray diffraction pattern (CuKα ray) having main diffraction peaks around 2θ=6.0°, 7.7°, and/or 8.7°, as well as around 18.0°, and more typically demonstrates the powder X-ray diffraction patterns as illustrated in FIGS. 2(a), (b), and (f).

Note that either one of, or both of, the diffraction peaks at around 2θ=7.7° and 8.7° may be observed. Therefore, the layered silicate A is characterized by any of a powder X-ray diffraction pattern having main diffraction peaks at around 2θ=6.0°, 7.7°, 8.7°, and 18.0° (for example, powder X-ray diffraction patterns illustrated in FIGS. 2(a) and (b)); a powder X-ray diffraction pattern having main diffraction peaks at around 2θ=6.0°, 7.7°, and 18.0°; and a powder X-ray diffraction pattern having main diffraction peaks at around 2θ=6.0°, 8.7°, and 18.0° (for example, the powder X-ray diffraction pattern illustrated in FIG. 2(f)).

The X-ray diffraction pattern (CuKα ray) of the layered silicate A is more generally characterized by the diffraction patterns listed below.

| Intensity (%) | 2θ (°) |
|---|---|
| 100 | 6.0 ± 0.2 |
| (5-20) | 7.7 ± 0.2 |
| (5-20) | 8.7 ± 0.2 |
| 25-70 | 18.0 ± 0.2 |

<Step (b)>

In step (b) that constitutes the production method of the present invention, the cage silicate obtained in step (a) is treated in an autoclave.

The step of treating the cage silicate obtained in step (a) in an autoclave only requires a step of pressure-heating in a pressure vessel, without particular limitation on the specific conditions and operations, in which for example the cage silicate may be filled in a pressure vessel and may be treated at a temperature of 80° C. or higher and lower than 300° C. The cage silicate may also be held, for example, in the autoclave vessel made of Teflon (registered trademark), at a predetermined temperature.

The cage silicate may be held at a constant temperature, or at temperatures varied in two steps or three steps. After going through step (b), the cage silicate may be grown up to the layered compound.

Although no particular limitation is applied to the holding time in step (b), it may be carried out for 7 days or longer and 30 days or shorter for example. A holding time of 10 days or longer and 21 days or shorter is particularly preferred. The holding time of 10 days or longer is preferred since the layered silicate may be grown up enough. Although holding beyond 30 days is possible, it is efficient to hold no longer than 21 days.

The layered silicate of the present invention has a layered structure in which two or more single-layered silica layers are stacked while placing interlayer cations in between. The silica layer is a layer composed substantially of $SiO_2$ only and refers to a silica nanosheet produced in an embodiment of the present invention as described later.

The particle morphology of the layered silicate is usually flaky (may also referred to as layer-like, flat plate-like, plate-like, or disk-like), which may be confirmed by observation under a scanning electron microscope. In observation under a scanning electron microscope, the layered silicate may be confirmed as a single flaky particle, and/or as an aggregate of a plurality of flaky particles. The shape of the aggregate thus observed may be petal-like, for example.

The particle size of the layered silicate may be confirmed by observing the average major diameter, and the width orthogonal to the maximum major diameter under a scanning electron microscope or a transmission electron microscope. The average major diameter is usually 100 nm to 10 µm, meanwhile the width orthogonal to the maximum major diameter is usually 50 nm to 10 µm on average. The thickness of the layered silicate may be measured under an atomic force microscope. The average thickness is usually 3 nm to 5 µm.

Formation of the layered silicate, and the crystal structure thereof may be identified from the powder X-ray diffraction pattern (diffraction peak position) of the product of the aforementioned step (b). More specifically, measurement conditions and analysis methods described in Non-Patent Literature 2 or Examples of the present application are applicable.

The layered structure, if occurred, may be confirmed by peaks that are attributable to bottom plane distance and appear at around 2θ=6° in the diffraction pattern obtained by powder XRD analysis.

As described above, the formation of the layered silicate in the present invention may be confirmed by observation of the shape and particle size under a SEM or TEM; observation of the aforementioned diffraction patterns in powder XRD analysis; and check that the crystal structure corresponds to the aforementioned one.

As described previously, with the ratio of the mole number of water to the mole number of the anion component in terms of $SiO_2$, ($H_2O/SiO_2$), in the cage silicate provided in step (a) of 3.6 or larger and smaller than 7.0, it is possible to obtain a layered silicate having the ULS-1 structure after going through step (b). The powder X-ray pattern of the layered silicate having the ULS-1 structure is as illustrated in FIG. 1 of Non-Patent Literature 2 or the like. In particular, with the ratio of 3.6 or larger and smaller than 5.0, the layered silicate formed of a single phase of the ULS-1 is obtainable.

Again as described previously, with the ratio of the mole number of water to the mole number of the anion component in terms of $SiO_2$, ($H_2O/SiO_2$), in the cage silicate provided in step (a) to 1.5 or larger and smaller than 3.6, or 5.0 or larger and smaller than 12.0, it now becomes possible to obtain a layered silicate (layered silicate A) that can produce the later-described nanosheet, only simply by contacting it with the a hydrophilic medium. The ratio is preferably 8.5 or larger and smaller than 12.0 in view of further increasing the yield.

The layered silicate formed in step (b) and recovered from the autoclave may be washed, dried, calcinated, sintered or the like as appropriate, before use.

In one embodiment, the layered silicate is separated from the suspension that is recovered from the autoclave with the layered silicate contained therein, by an appropriate method in at least one step. The separation may be achieved by, for example, filtration, ultrafiltration, diafiltration or centrifugation, as well as by, for example, spray drying or spray granulation. Separation by spray drying or filtration is preferable. The suspension per se recovered from the autoclave, or a condensate thereof obtained after condensing the suspension, may be subjected, for example, to separation by spraying. The condensation may be achieved, for example, by evaporation such as evaporation under reduced pressure, or cross-flow filtration. Similarly, the suspension recovered from the autoclave may be separated into two fractions, the solid contained in one of the two fractions may be separated by filtration, ultrafiltration, diafiltration, or centrifugation, optionally followed by washing and/or drying, and the resultant solid may be suspended into the other fraction of the suspension to accomplish the condensation. The sprayed material obtained by fluidized bed spray granulation drying, which is an example of separation-drying method such as spray drying or spray granulation drying, may contain solid and/or hollow sphere, both may substantially be spheres, having a diameter within, for example, the range of from 5 to 500 or from 5 to 300 During the spraying, a single-component nozzle or multi-component nozzles may be used as the spray nozzle. Alternative choice is to use a rotary atomizer. A possible temperature of the carrier gas at the intake falls within, for example, the range of from 200 to 600° C., preferably within the range of from 225 to 550° C., and more preferably within the range of from 300 to 500° C. The temperature of the carrier gas at the exhaust port falls within, for example, the range of from 50 to 200° C. The carrier gas is exemplified by air, thin air, and an oxygen-nitrogen mixed gas having an oxygen content of 10 vol % or less, preferably 5 vol % or less, more preferably less than 5 vol %, for example 2 vol % or less. The spraying may be carried out in countercurrent or parallel current.

The separation may be followed by at least one washing step and/or at least one drying step. The washing step, when takes place at least twice, may use the same or different kinds of washing agent, or a mixture of washing agents. The drying step, when takes place at least twice, may employ the same or different drying temperatures.

The drying temperature preferably falls within the range of from room temperature to 150° C., more preferably from 60 to 140° C., even more preferably from 80 to 130° C., and yet more preferably from 100 to 120° C.

The drying time preferably falls within the range of from 6 to 48 hours, and more preferably 12 to 36 hours.

The layered silicate formed in step (b) may be washed with a washing agent, such as water, an organic solvent, or a mixture thereof, and/or dried at a temperature within, for example, the range of from room temperature to 150° C.

There is no specific limitation on the washing agent to be used, and it is selectable in consideration of swellability of the layered silicate. The washing agent may be, for example, water or alcohol or ketone, which are exemplified by methanol, ethanol, 1-propanol, 2-propanol, and acetone; or a mixture of two or more of them. The mixture is exemplified by a mixture of two or more kinds of alcohol such as methanol/ethanol, methanol/propanol, ethanol/propanol, and methanol/ethanol/propanol; and a mixture of water and at least one kind of alcohol, such as water/methanol, water/ ethanol, water/propanol, water/methanol/ethanol, water/methanol/propanol, water/ethanol/propanol, and water/methanol/ethanol/propanol.

Swellable layered silicate such as layered silicate A is preferably washed with acetone or the like, since washing with water would produce nanosheet.

For non-swellable layered silicate such as ULS-1, various washing agents including water and acetone may be preferably used.

The layered silicate obtained by the production method of the present invention may be used in various applications in which the layered silicate has been used, which include sorbent material such as adsorbent and deodorant, ion exchanger, softener, carrier for catalyst or the like, pigment, coating material, filler to resin or the like, cosmetic additive, daily necessities additive, and disinfectant. The layered silicate may further have the layer structure altered by intercalation with oxide such as silica, or by modification of the silanol group on the surface of the layer, for controlled selectivity to substance to be adsorbed or improved heat resistance, and may be applied, for example, to adsorbent, separation material such as a column material, water repellent, oil repellent, catalyst carrier for exhaust gas purification or the like, and filler.

The layered silicate obtained by the production method of the present invention is also suitable as a raw material for silica nanosheet. The layered silicate obtained by the production method of the present invention, particularly by the method of the embodiment, in which step (a) can provide the cage silicate having the ratio of the mole number of water to the mole number of the anion component in terms of $SiO_2$, ($H_2O/SiO_2$), of 1.5 or larger and smaller than 3.6, or 5.0 or larger and smaller than 12.0, is used as a raw material for silica nanosheet in a particularly suitable manner.

<Swelling Power of Layered Silicate>

The aforementioned novel layered silicate obtainable by one embodiment of the present invention has a high swelling power.

The swelling power (mL/g) may be evaluated by placing a predetermined amount of layered silicate powder in a transparent cylindrical glass container, adding water thereto, leaving the container at room temperature for 24 hours to swell the powder, and dividing the apparent volume of the powder by the mass of the powder originally placed. A swelling power of 10 mL/g or larger, and particularly 20 mL/g or larger, may be judged to be a large swelling power.

The aforementioned novel layered silicate usually has a swelling power of 20 mL/g or larger. With the swelling power of 20 mL/g or larger, the novel layered silicate can swell or delaminate only with water, demonstrating technical effects, such as easy formation of silica nanosheet described later.

<Step (c)>

The production method of the present invention preferably comprises step (c) of mixing activated silicic acid and a quaternary ammonium to crystallize a cage silicate from the mixed solution, prior to step (a). With use of the cage silicate obtained in step (c), the layered silicate may be produced more efficiently (in a short time) after going through steps (a) and (b).

The activated silicic acid contains a silicate ion and/or a silicate ion monomer, preferably as the main component. The activated silicic acid in the present embodiment also encompasses those obtained by hydrolyzing hydrolyzable silane compound, such as tetraethoxysilane, and those obtained by removing cation from alkali silicate solution obtained by dissolving anhydrous alkali silicate.

Among these, use of the activated silicic acid obtained by removing cation from the alkali silicate solution obtained by dissolving anhydrous alkali silicate is particularly preferred, since the production efficiency and cost of the cage silicate in step (c) may be improved, whereby the production efficiency over the entire production process of the layered silicate from step (c) through step (a) up to step (b) may be improved.

The alkali silicate solution is an aqueous solution that contains a silicate ion and/or a silicate ion monomer, and an alkali metal ion. The alkali silicate solution is more specifically exemplified by aqueous solution of sodium silicate, potassium silicate, or lithium silicate. Sodium silicate and so on are obtainable by any of known methods. For example, sodium silicate is obtainable by melting silicon dioxide with sodium carbonate or with sodium hydroxide at high temperatures, and then treating the obtained sodium silicate with water in an autoclave, whereby a highly viscous aqueous sodium silicate solution is obtainable. The aqueous solution is also called as water glass.

The alkali silicate solution used here is commercially available, for example from Tokuyama Corporation Co., Ltd., Aichikeiso Co., Ltd., and Oriental Silicas Corporation.

The alkali silicate solution, generally marketed at a $SiO_2$ concentration of 30 to 50% by mass, may be used as it is in step (c), or may be used after being diluted with water down to a $SiO_2$ concentration of 0.5% by mass to 10% by mass. The mole ratio of $M_2O$ (M represents sodium, potassium, lithium or the like) to $SiO_2$ ($SiO_2/M_2O$) in the alkali silicate solution is not particularly limited.

The activated silicic acid derived from the alkali silicate solution is obtainable by removing the cation contained in the alkali silicate solution. The method for removing the cation used here may be any of known methods, without special limitation. For example, an aqueous sodium silicate solution may be contacted with an H-type cation exchange resin, thereby removing sodium ion. The contact may take place in a batch system or column system, which is industrially carried out by packing an ion exchange tower with a cation exchange resin, through which the alkali silicate solution is allowed to flow. The flow may occur at a space velocity of 1 to 30 (L/hr), at a temperature of 10 to 80° C. The cation exchange resin is exemplified by sulfonated strongly acidic cation exchange resin (in H form), and carboxylated weakly acidic cation exchange resin (in H form), wherein particularly preferred is the sulfonated strongly acidic cation exchange resin conditioned in the H form.

The sulfonated strongly acidic cation exchange resin is exemplified by AmberLite (registered trademark) IR-120B manufactured by Organo Corporation.

The $SiO_2$ concentration of the alkali silicate solution during the flow may be 0.5% by mass to 15% by mass, which is preferably 1% by mass to 10% by mass in particular.

The method may include a step for removing anion, before or after the removal of the cation in the alkali silicate solution, for the purpose of reducing impurity in the obtained activated silicic acid. The method may alternatively include a step for washing with use of an ultrafiltration device, before or after the removal of the cation in the alkali silicate solution. The method may still alternatively include a step for removing metal ion with use of a chelating agent or a chelating resin, before or after the removal of the cation in the alkali silicate solution.

The quaternary ammonium usable here may be a compound represented by formula (4) below.

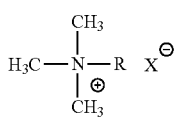

formula (4)

(in formula (4), R represents an alkyl group having 2 to 9 carbon atoms, and X represents a hydroxy ion, carbonate ion, or halide ion.)

The quaternary ammonium represented by formula (3) is exemplified by hydroxides, such as ethyltrimethylammonium hydroxide, propyltrimethylammonium hydroxide, butyltrimethylammonium hydroxide, pentyltrimethylammonium hydroxide, hexyltrimethylammonium hydroxide, heptyltrimethylammonium hydroxide, octyltrimethylammonium hydroxide, and nonyltrimethylammonium hydroxide.

The quaternary ammonium is also exemplified by carbonates, such as ethyltrimethylammonium carbonate, propyltrimethylammonium carbonate, butyltrimethylammonium carbonate, pentyltrimethylammonium carbonate, hexyltrimethylammonium carbonate, heptyltrimethylammonium carbonate, octyltrimethylammonium carbonate, and nonyltrimethylammonium carbonate.

The quaternary ammonium is also exemplified by chlorides such as ethyltrimethylammonium chloride, propyltrimethylammonium chloride, butyltrimethylammonium chloride, pentyltrimethylammonium chloride, hexyltrimethylammonium chloride, heptyltrimethylammonium chloride, octyltrimethylammonium chloride, and nonyltrimethylammonium chloride.

The quaternary ammonium is also exemplified by bromides such as ethyltrimethylammonium bromide, propyltrimethylammonium bromide, butyltrimethylammonium bromide, pentyltrimethylammonium bromide, hexyltrimethylammonium bromide, heptyltrimethylammonium bromide, octyltrimethylammonium bromide, and nonyltrimethylammonium bromide.

In particular, the quaternary ammonium is preferably ethyltrimethylammonium hydroxide, propyltrimethylammonium hydroxide, butyltrimethylammonium hydroxide, pentyltrimethylammonium hydroxide, hexyltrimethylammonium hydroxide, heptyltrimethylammonium hydroxide, and octyltrimethylammonium hydroxide.

Although the ratio of the mole number of quaternary ammonium to the mole number of activated silicic acid in terms of $SiO_2$, (quaternary ammonium/$SiO_2$), to be mixed in step (c) is not particularly limited, it is preferred to mix activated silicic acid and quaternary ammonium so as to have the ratio be 0.7 to 1.5, and preferably to have the ratio be 1.0 to 1.5 in particular.

The concentration of the mixed solution in terms of $SiO_2$ in step (c) is preferably, but again not particularly limited to, 0.01% by mass to 10% by mass, and preferably 1.0% by mass to 10% by mass in particular.

In step (c), a mixed solution of activated silicic acid and quaternary ammonium may be stirred at 10° C. to 80° C. for 30 minutes to 30 hours. In particular, the temperature is preferably 15° C. to 40° C. The stirring time will suffice as long as the mixed solution of activated silicic acid and quaternary ammonium is stirred thoroughly.

The stirring time is preferably 10 hours or shorter, preferably 5 hours or shorter in particular. With the stirring time of 30 hours or shorter, the cage silicate is obtainable efficiently. With the $SiO_2$ concentration of the activated silicic acid increased by condensing the mixed solution prior to the crystallization described later, the stirring time may be shortened.

From the mixed solution, the cage silicate is crystallized. More specifically, the cage silicate may be crystallized by cooling the mixed solution for example. During the crystallization, the cage silicate can be crystallized by cooling making use of the temperature dependence of the solubility to aqueous solvent, and may be separated from the solution.

The method may further include a step of condensing the mixed solution before crystallizing the cage silicate. The condensation may be carried out by any of known methods. For example, an evaporator may be used to increase the $SiO_2$ concentration of the mixed solution, while removing the solvent under reduced pressure. The $SiO_2$ concentration of the mixed solution after the condensation may be 1% by mass to 30% by mass. In particular, the $SiO_2$ concentration is preferably 5% by mass to 20% by mass. With the $SiO_2$ concentration of the mixed solution after the condensation of 30 mass % or below, the crystallization of the cage silicate may be accelerated. Also, increased $SiO_2$ concentration of the mixed solution may shorten the stirring time.

For accelerated crystallization of the cage silicate, a seed crystal such as a known cage silicate may be added to the mixed solution. The seed crystal may be added during cooling of the mixed solution, or during the condensation.

The crystallization may include holding at a temperature below the temperature at which the mixing takes place, and at which the aqueous medium does not freeze. In an exemplary case with water as the medium, the temperature may be 0° C. to 10° C. In particular, the temperature is preferably 0° C. to 5° C. With the temperature of 0° C. or above, the aqueous solvent may be prevented from freezing. With the temperature of 10° C. or below, the crystallization of the cage silicate may be promoted. The holding time may range from 30 minutes to 24 hours. The holding time is preferably 3 hours to 24 hours. With the holding time of 30 minutes or longer, the cage silicate may be sufficiently crystallized. With the holding time of 24 hours or shorter, the production time may be shortened to efficiently obtain the cage silicate.

After the crystallization of the cage silicate, the cage silicate can be separated and collected by filtering the mixed solution that contains the cage silicate. The filtration may be carried out by any of known methods. An exemplary method of filtration is such as allowing the mixed solution to pass through a quantitative filter paper having a retention particle size of 1 μm, to separate and collect the cage silicate.

The cage silicate obtained in step (c) preferably has the ratio of the mole number of the cation component represented by formula (2) in terms of quaternary ammonium to the mole number of silicic acid in terms of $SiO_2$, (quaternary ammonium/$SiO_2$), of 0.7 to 1.5. Also the ratio of the mole number of water to the mole number of the anion component in terms of $SiO_2$, ($H_2O/SiO_2$), is preferably 0.7 to 30. With these preferred conditions, particularly the latter condition, satisfied, the cage silicate obtained in step (c) will be directly applicable to the subsequent steps.

<Silica Nanosheet>

An embodiment of the present invention provides a method of producing a silica nanosheet, the method further includes contacting the layered silicate with a aqueous medium, wherein the layered silicate has been processed in step (a) so as to have the ratio of the mole number of water to the mole number of the anion component in terms of $SiO_2$, ($H_2O/SiO_2$), in the cage silicate be 1.5 or larger and smaller than 3.6, or 5.0 or larger and smaller than 12.0 (by removing water, etc.), and has been treated in an autoclave in step (b).

The silica nanosheet is a single-layered flaky (may also be referred to as a layer-like, flat plate-like, plate-like, or disk-like) particle composed only of $SiO_2$, having a maximum diameter of 0.1 µm to 5 µm, and a thickness of 1 nm to 50 nm, or 1 nm to 10 nm, or 1 nm to 3 nm. The maximum length of the silica nanosheet may be determined by observation under a transmission electron microscope or a scanning electron microscope. The thickness of the silica nanosheet may be measured under an atomic force microscope.

After going through the contacting step, one to several layers of the layered silicate delaminate to produce a silica nanosheet.

While production of the silica nanosheet by conventional technique usually needed a delamination agent, this embodiment with use of the aforementioned specific layered silicate can obtain a silica nanosheet, no longer needing such delamination agent.

Although a mechanism why the use of the specific layered silicate made it possible to obtain a silica nanosheet simply by contacting the layered silicate with the aqueous medium partially remains unclear, the specific layered silicate (that is, the layered silicate produced by the production method in which step (a) can provide the cage silicate having the ratio of the mole number of water to the mole number of the anion component in terms of $SiO_2$, ($H_2O/SiO_2$), of 1.5 or larger and smaller than 3.6, or 5.0 or larger and smaller than 12.0) has a novel crystal structure and demonstrates a large swelling power as described above, and such large swelling power presumably has some contribution to make the layered silicate more likely to delaminate between the silica layers.

The proportion of the aqueous medium and the layered silicate to be contacted in this embodiment is not particularly limited, wherein it is preferred to contact 0.1 parts by mass to 15 parts by mass of the layered silicate with 100 parts by mass of the aqueous medium, the proportion is preferably 1 part by mass to 10 parts by mass in particular.

The contacting may be accomplished, for example, by placing predetermined amounts of the aqueous medium and the layered silicate in a container, and by holding the mixture at room temperature. For the purpose of improving the efficiency of production of the silica nanosheet, the mixture may be heated in a temperature range not higher than the boiling point of the aqueous medium, an stirring, or cavitation under sonication or the like can be utilized.

Although the aqueous medium is not particularly limited, water, an organic solvent, or a mixture thereof is suitably used. The organic solvent is exemplified by hydrophilic organic solvent, wherein lower alcohol, such as methanol, ethanol, isopropanol, or butanol, is suitably used.

The silica nanosheet obtained after the contacting is well dispersible in the aqueous medium, and is thus obtainable as a silica nanosheet dispersion. The silica nanosheet dispersion is obtainable as an aqueous dispersion with water selected as the aqueous medium, meanwhile obtainable as an organic solvent dispersion with the organic solvent selected as the aqueous medium.

The silica nanosheets obtained by the production method of the present embodiment may be suitably used in various applications to which silica nanosheet has been conventionally applied, which include inorganic fillers, coating materials, separation membranes, gas barrier membranes and so on for example.

EXAMPLES

The present invention will be specifically described referring to the following Examples/Comparative Examples. The present invention is, however, by no means limited by these Examples/Comparative Examples.

In the following Examples/Comparative Examples, each of the characteristics was measured or evaluated according to the following methods.

(1) Quantification of $SiO_2$ Concentration in Activated Silicic Acid and Cage Silicate Activated silicic acid or cage silicate was calcined at 1000° C., and from the mass of the resultant calcined residue, the $SiO_2$ concentration was determined.

(2) Identification of Structure of Cage Silicate (CP-MAS Method)

The obtained silicate powder was analyzed by the CP-MAS method with use of a solid $^{29}$Si-NMR spectrometer AVANCE 3500 (manufactured by Bruker Corporation). The cage silicate was identified by confirming that signals attributable to Si of the Q3 structure appear only in a region around −92 ppm to −100 ppm.

(3) Measurement of Water Content of Cage Silicate

The quaternary ammonium content and the silicon dioxide content ($SiO_2$ concentration in (1), above) contained in the obtained cage silicate were quantified, and these contents were subtracted from the mass of the cage silicate, to determine the water content of the cage silicate.

From the water content and the $SiO_2$ concentration of the cage silicate measured in (1), above, the ratio of the mole number of water to the mole number of the anion component in terms of $SiO_2$, ($H_2O/SiO_2$), in the cage silicate was calculated.

(4) Measurement of Quaternary Ammonium Content in Cage Silicate

Powder of the obtained cage silicate was analyzed with PerkinElmer 2400 Series II CHNS/O Elemental Analyzer (manufactured by PerkinElmer Japan) to determine the nitrogen content, and the nitrogen content was then converted to the quaternary ammonium content.

(5) Observation of Layered Silicate

The layered silicate was observed under a scanning electron microscope S-4300 (manufactured by Hitachi High-Tech Corporation).

(6) Confirmation of Presence/Absence of Layered Structure of Layered Silicate, and Measurement of Crystal Structure An X-ray diffraction pattern (CuKα ray) was obtained with use of a powder X-ray diffractometer PINT-Ultima (manufactured by Rigaku Corporation), from which the crystal structure was identified. Peaks observed at around 2θ=6° were judged to represent layered structure.

(7) Observation of Silica Nanosheet

Observation was carried out under a transmission electron microscope JEM-1400 Flash (manufactured by JEOL Ltd.). A sheet-like particle, when observed, was judged to represent formation of a silica nanosheet.

(8) Measurement of Thickness of Silica Nanosheet

The silica nanosheet was observed under an atomic force microscope (AFM) Cypher VRS (manufactured by Asylum Research). The probe used here was RTESPA-150. A 1-cm square Si wafer (manufactured by Global Wafers Co., Ltd.) was hydrophilized by glow discharge treatment for 3 minutes with use of iON CLEANER (JIC-410) manufactured by JEOL Ltd. Ten milligrams of the layered silicate powder was added to 10 ml of pure water to cause partial swelling and dispersion, the mixture was allowed to stand still for 12 hours, and the supernatant was collected as a silica nanosheet dispersion for AFM observation. The silica nanosheet dispersion was dropped onto the Si wafer, dried on a hot plate at 100° C., and then fixed to a stage with a mounting wax (manufactured by JEOL Ltd., phthalic anhydride: 60 to 90% by mass, ethylene glycol: 10 to 40% by mass). The thickness of the silica nanosheet applied onto the Si wafer was observed under the AFM, with a spring constant of approximately 6 N/m, at a resonance frequency of approximately 120 kHz, and at a scanning speed of 1.5 Hz.

[Synthesis Example 1] Synthesis of Cage Silicate

No. 4 water glass (manufactured by Nippon Chemical Industrial Co., Ltd., mole ratio $SiO_2:Na_2O:H_2O=3.9:1:39.0$, $SiO_2$ concentration=23.44% by mass, $Na_2O$ concentration=6.3% by mass) which amounts 450.00 g was diluted with pure water down to 3.6%, and subjected to cation exchange with a cation exchange resin (AmberLite 120B manufactured by Organo Corporation) to obtain 3004.95 g of activated silicic acid ($SiO_2$ yield: 98%). To a 3 L evaporating flask, placed were 1764.71 g (1.01 mol) of the thus obtained activated silicic acid ($SiO_2$ concentration: 3.4%) and 525.00 g (1.00 mol) of an aqueous solution of ethyltrimethylammonium hydroxide (manufactured by Sachem Japan Inc., concentration: 20 wt %), and the content was stirred at room temperature for 24 hours with a stirring blade. The mixed solution was condensed under reduced pressure with use of an evaporator down to 20% of the total mass, and then allowed to stand still at 5° C. for 12 hours to precipitate crystals. The mixed solution that contained the crystals was filtered under suction through a quantitative filter paper 5B (manufactured by ADVANTEC) for solid-liquid separation, thereby collecting 297.4 g of cage silicate ($SiO_2$ concentration: 16.20 wt %, mole ratio $SiO_2:ETMA^+:H_2O=1.0:0.9:12.8$). The product was confirmed to be cage silicate by the CP-MS method with use of a solid $^{29}Si$-NMR spectrometer.

[Synthesis Example 2] Synthesis of Cage Silicate

To a 3 L evaporating flask, placed were 88.2 g (0.05 mol) of activated silicic acid obtained by the same procedures as in Synthesis Example 1 ($SiO_2$ concentration: 3.4%) and 150.8 g (0.05 mol) of an aqueous solution of cethyltrimethylammonium hydroxide (manufactured by Tokyo Chemical Industry Co., Ltd., concentration: 10 wt %), and the content was stirred at room temperature for 24 hours with a stirring blade. The mixed solution was allowed to stand still at 5° C. for 12 hours to precipitate crystals. The mixed solution that contained the crystals was filtered under suction through a quantitative filter paper 5B for solid-liquid separation, thereby collecting 14.2 g of cage silicate ($SiO_2$ concentration: 9.1 wt %, mole ratio $SiO_2:CTMA^+:H_2O=1.0:0.6:4.4$). The product was confirmed to be cage silicate with use of a solution $^{29}Si$-NMR spectrometer.

Example 1

Into a heat-resistant vessel, placed was 40.0 g of the cage silicate obtained in Synthesis Example 1, and the content was dried in a vacuum drier at a degree of vacuum of $6.7 \times 10^{-2}$ Pa, at 60° C. for 1 hour, to remove water in the cage silicate to prepare Precursor 1. The Mole ratio of $SiO_2$: $ETMA^+:H_2O$ in this process was 1.0:0.9:10.7. Into a stainless steel (SUS304) sealed vessel, 2.0 g of the thus obtained Precursor 1 was placed and subjected to autoclave treatment being allowed stand still under heating at 150° C. for 13 days to obtain a white solid. The obtained white solid was washed with acetone, excessive acetone was removed by suction filtration, and the white solid was then vacuum-dried at 60° C. in a vacuum dryer to obtain a white powder. The thus obtained white powder was analyzed by powder X-ray diffractometry, in which peaks specific to a layered compound were observed (FIG. 2(a)). Observation under a scanning electron microscope revealed an aggregate of a plurality of disk-shaped particles to confirm that a layered silicate was produced (FIG. 1-1(a)).

Example 2

A layered silicate was prepared according to the procedures same as those in Example 1, except that the vacuum drying time of the cage silicate obtained in Synthesis Example 1 was changed to 2 hours. The precursor in this process was found to have a mole ratio $SiO_2:ETMA^+:H_2O$ of 1.0:0.9:8.8.

The thus obtained white powder was analyzed by powder X-ray diffractometry, in which peaks specific to a layered compound were observed (FIG. 2(b)). Observation under a scanning electron microscope revealed an aggregate of a plurality of disk-shaped particles to confirm that a layered silicate was produced (FIG. 1-1(b)).

Example 3

A layered silicate was prepared according to the procedures same as those in Example 1, except that the vacuum drying time of the cage silicate obtained in Synthesis Example 1 was changed to 3 hours. The precursor in this process was found to have a mole ratio $SiO_2:ETMA^+:H_2O$ of 1.0:0.9:5.9. The thus obtained white powder was analyzed by powder X-ray diffractometry, in which peaks specific to a layered compound and the USL-1 structure were observed (FIG. 2(c)). Observation under a scanning electron microscope revealed an aggregate of a plurality of disk-shaped particles to confirm that a layered silicate was produced (FIG. 1-1(c)).

Example 4

A layered silicate was prepared according to the procedures same as those in Example 1, except that the vacuum drying time of the cage silicate obtained in Synthesis Example 1 was changed to 4 hours. The precursor in this process was found to have a mole ratio $SiO_2:ETMA^+:H_2O$ of 1.0:0.9:4.5. The thus obtained white powder was analyzed by powder X-ray diffractometry and was confirmed to have the ULS-1 structure (FIG. 2(d)). Observation under a scanning electron microscope revealed an aggregate of a plurality of disk-shaped particles to confirm that a layered silicate was produced (FIG. 1-2(d)).

Example 5

A layered silicate was prepared according to the procedures same as those in Example 1, except that the vacuum drying time of the cage silicate obtained in Synthesis Example 1 was changed to 5 hours. The precursor in this process was found to have a mole ratio $SiO_2:ETMA^+:H_2O$ of 1.0:0.9:3.7. The thus obtained white powder was analyzed by powder X-ray diffractometry and was confirmed to have the ULS-1 structure (FIG. 2(e)). Observation under a scanning electron microscope revealed an aggregate of a plurality of disk-shaped particles to confirm that a layered silicate was produced (FIG. 1-2(e)).

Example 6

A layered silicate was prepared according to the procedures same as those in Example 1, except that the vacuum drying time of the cage silicate obtained in Synthesis Example 1 was changed to 6 hours. The precursor in this process was found to have a mole ratio $SiO_2:ETMA^+:H_2O$ of 1.0:0.9:3.5. The thus obtained white powder was analyzed by powder X-ray diffractometry, in which peaks specific to a layered compound were observed (FIG. 2(f)). Observation under a scanning electron microscope revealed an aggregate of a plurality of disk-shaped particles to confirm that a layered silicate was produced (FIG. 1-2(f)).

(Evaluation of Swelling Power of Layered Silicate)

In a 10 mL sample bottle, placed were 0.1 g of each of the layered silicate powders from Examples 1 to 6, and 10 mL of pure water, and the mixtures were allowed to stand at room temperature for 24 hours. The apparent volume of each layered silicate swollen after standing was read, and the apparent volume was then divided by the mass of the powder to determine the swelling power (mL/g). The results are summarized in Table 1.

Comparative Example 1

A trail was made to prepare a layered silicate in the same manner as in Example 1, except that the cage silicate obtained in Synthesis Example 2 was used in place of the cage silicate obtained in Synthesis Example 1, and vacuum drying was skipped.

The thus obtained white powder was analyzed by powder X-ray diffractometry, in which peaks specific to a layered compound were not observed, and hence it was presumed that the layered silicate was not produced (FIG. 2(g)).

Example 7

Figure 3:
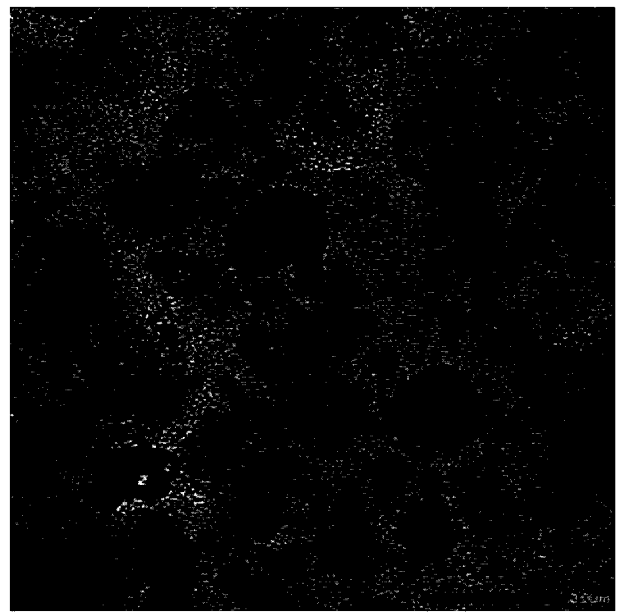
Figure 2:
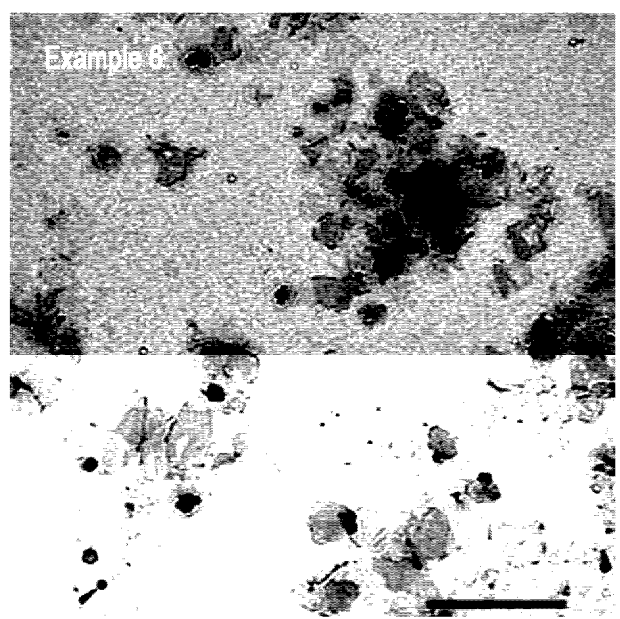
Figure 4:
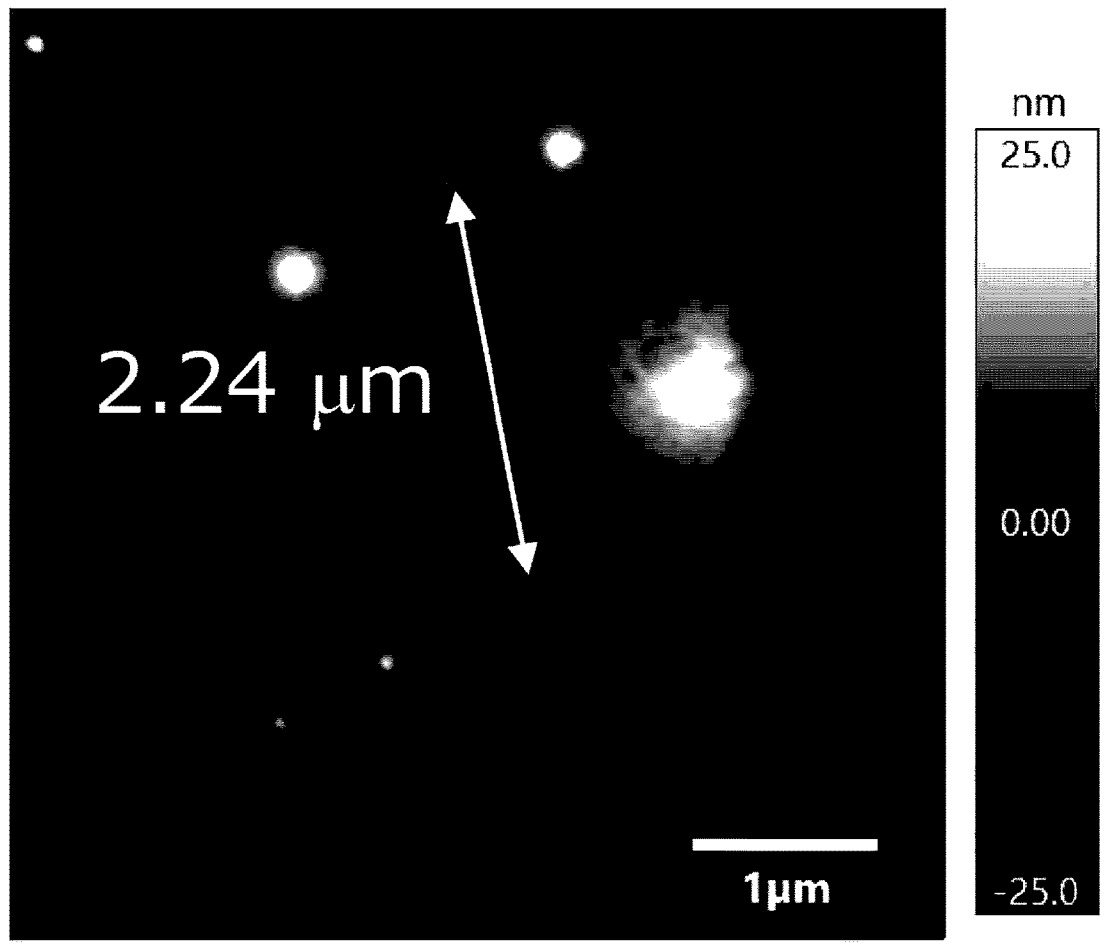
Figure 1:
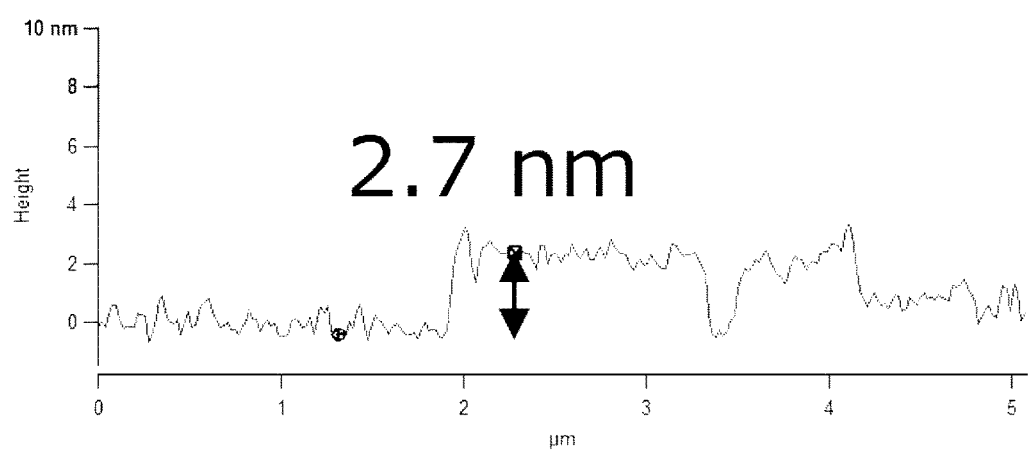
Figure 4:
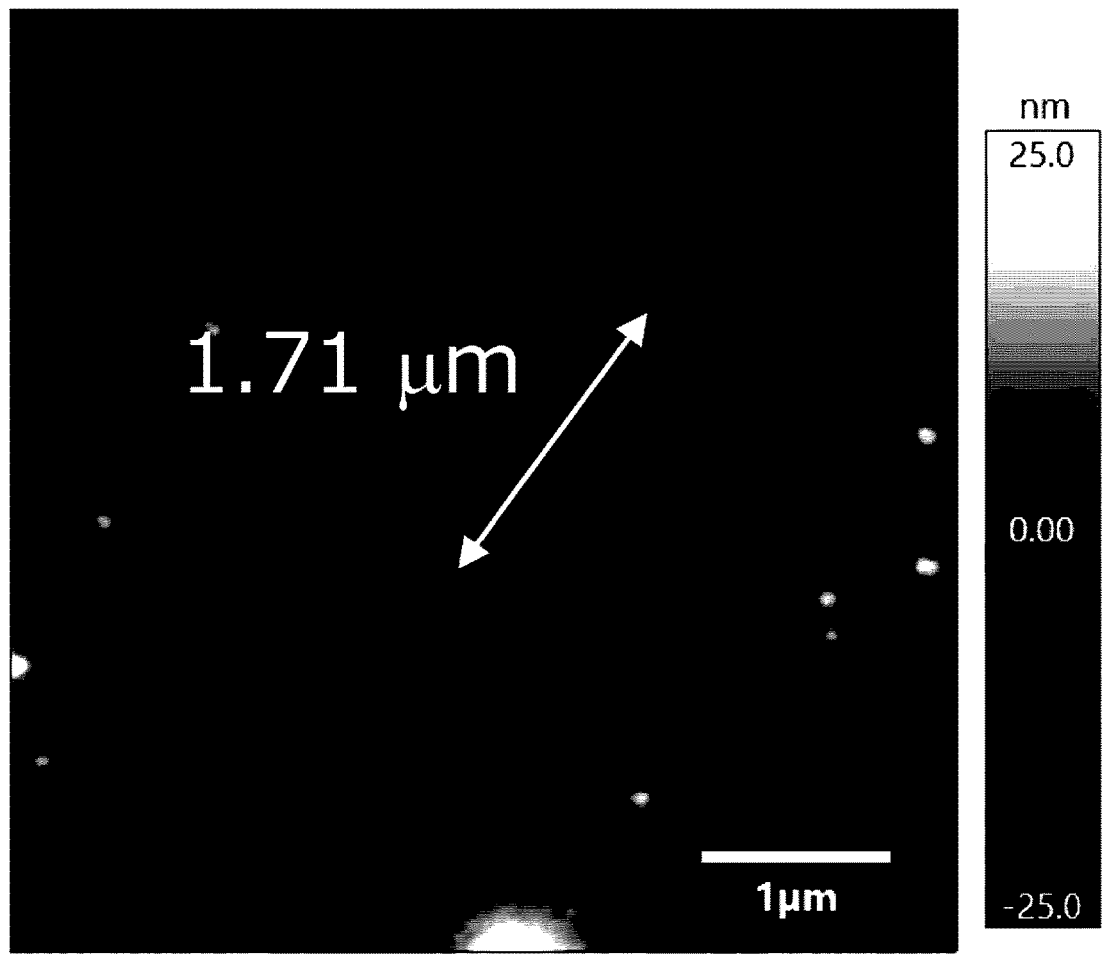
Figure 2:
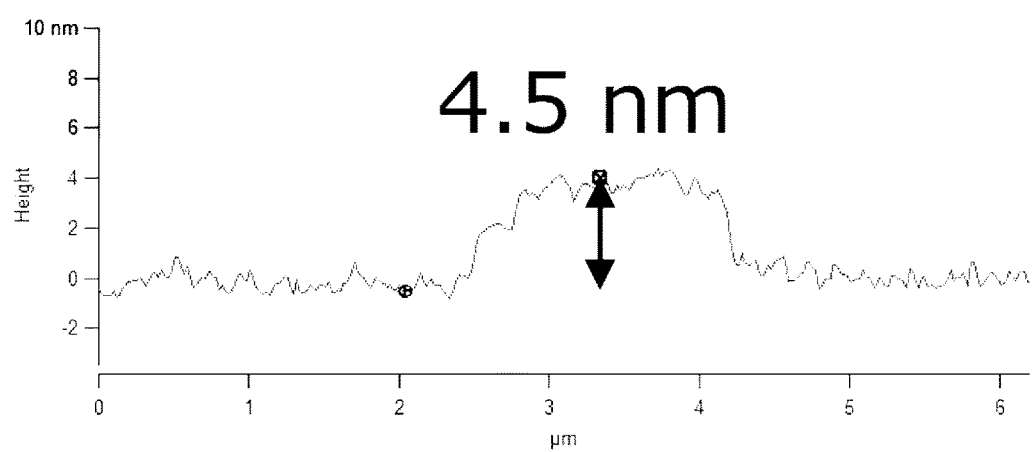
Figure 4:
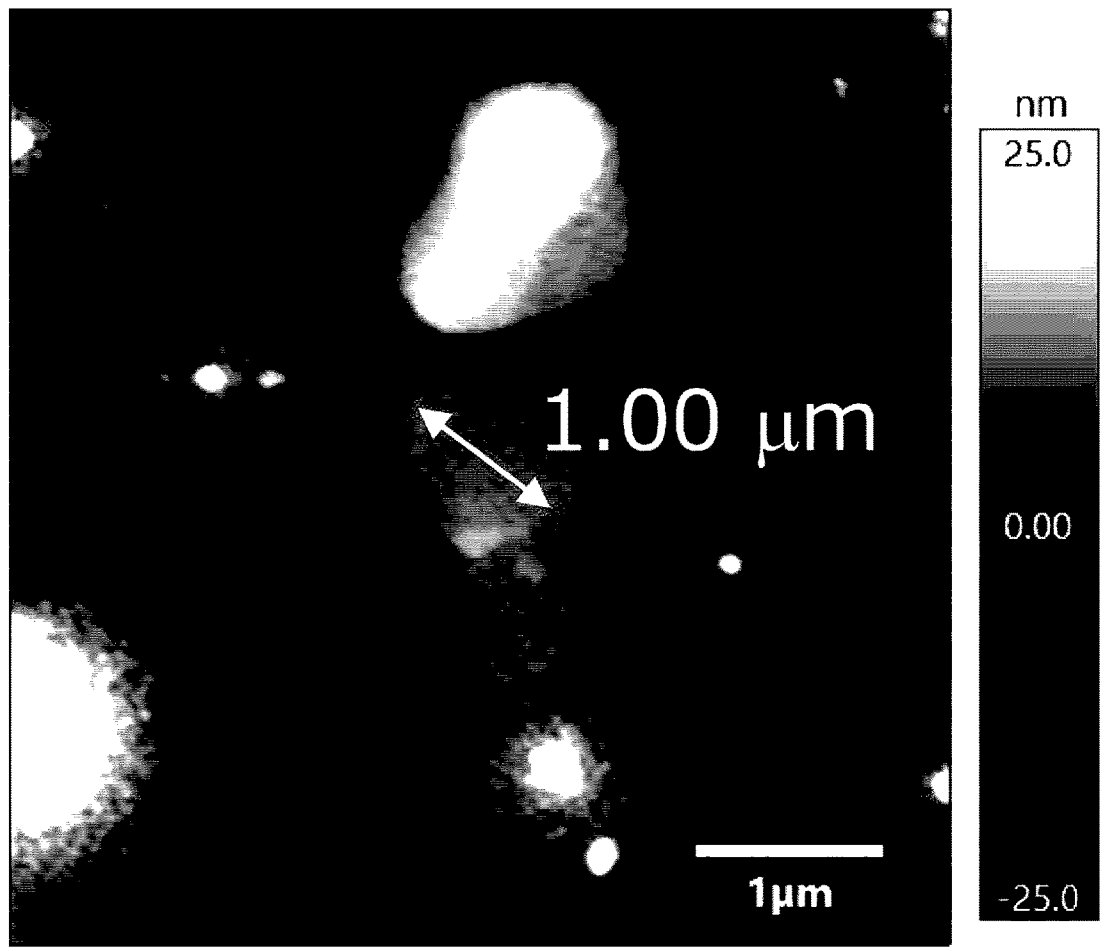
Figure 3:
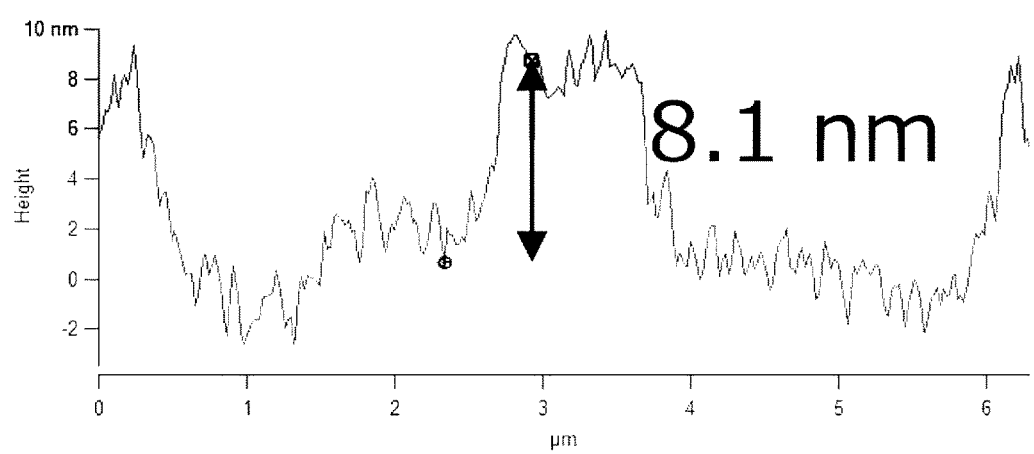
Figure 4:
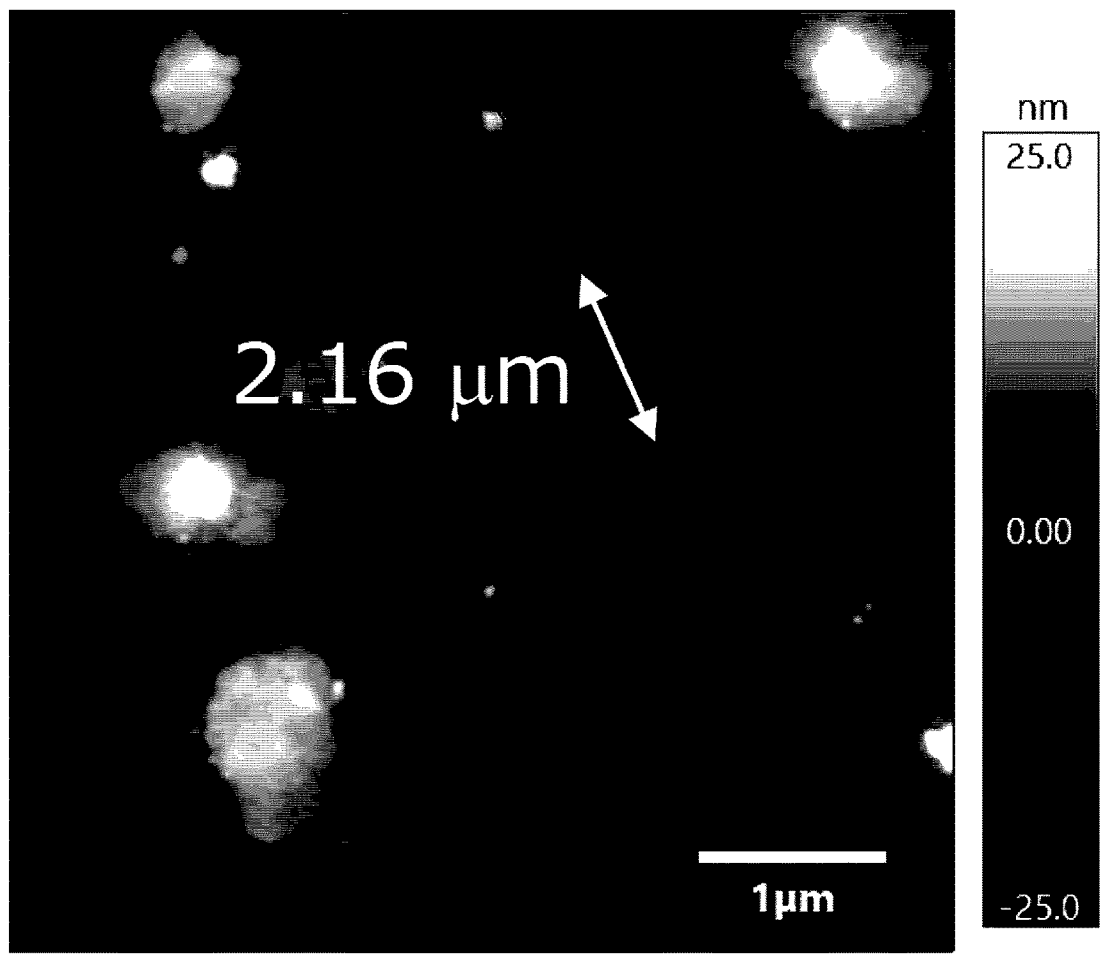
Figure 4:
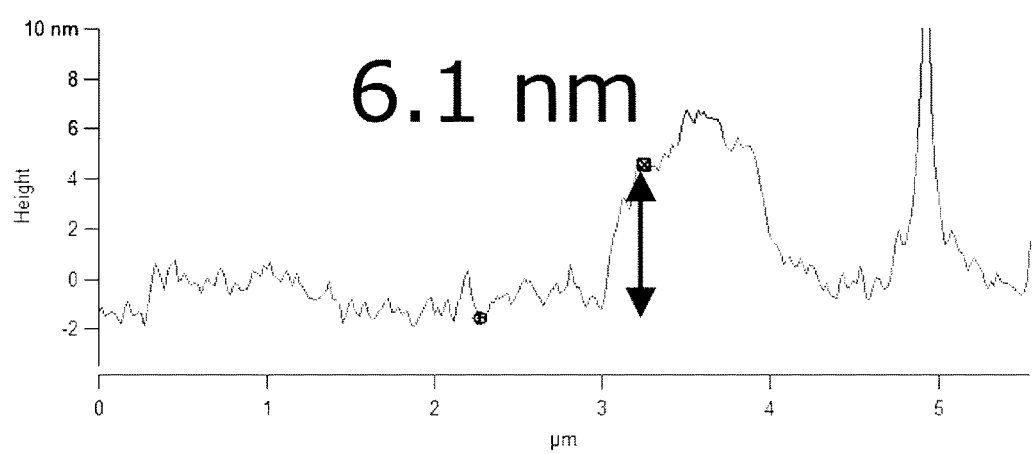

In a 10 mL sample bottle, placed were 0.1 g of the layered silicate obtained in Example 1, and 10 g of pure water, and the mixture was allowed to stand at room temperature for 24 hours. Proportion of the layered silicate in this process was 1 part by mass per 100 parts by mass of pure water. A part of the supernatant after the standing was sampled and observed under a transmission electron microscope to confirm that a silica nanosheet was produced (FIG. 3-1(a)). Observation according to the procedures described in the section entitled "Measurement of Thickness of Silica Nanosheet" revealed that the silica nanosheet had a maximum diameter of 2.24 µm, and a thickness of 2.7 nm (FIG. 4-1).

Example 8

Figure 2:
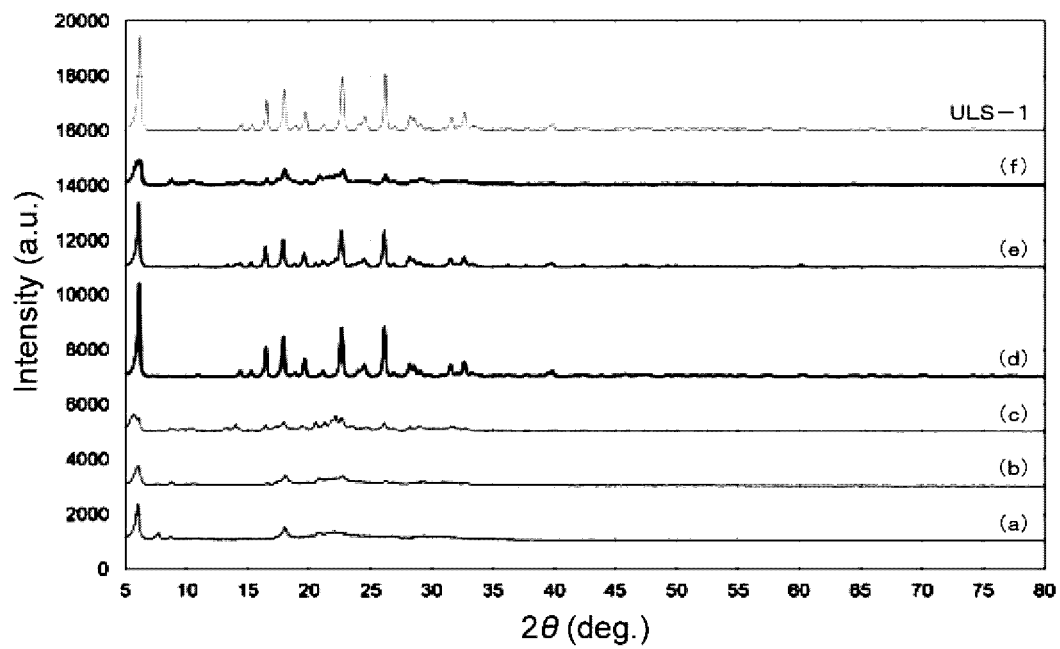
Figure 2:
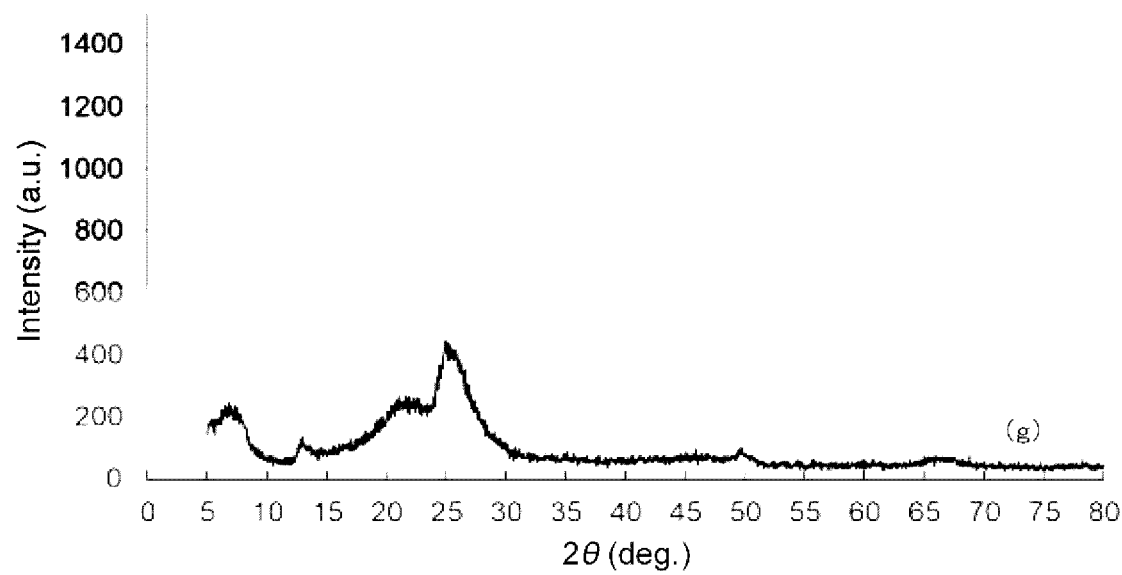

In a 10 mL sample bottle, placed were 0.1 g of the layered silicate obtained in Example 2, and 10 g of pure water, and the mixture was allowed to stand at room temperature for 24 hours. Proportion of the layered silicate in this process was 1 part by mass per 100 parts by mass of pure water. A part of the supernatant after the standing was sampled and observed under a transmission electron microscope to confirm that a silica nanosheet was produced (FIG. 3-1(b)). Observation according to the procedures described in the section entitled "Measurement of Thickness of Silica Nanosheet" revealed that the silica nanosheet had a maximum diameter of 1.71 µm, and a thickness of 4.5 nm (FIG. 4-2).

Example 9

In a 10 mL sample bottle, placed were 0.1 g of the layered silicate obtained in Example 3, and 10 g of pure water, and the mixture was allowed to stand at room temperature for 24 hours. Proportion of the layered silicate in this process was 1 part by mass per 100 parts by mass of pure water. A part of the supernatant after the standing was sampled and observed under a transmission electron microscope to confirm that a silica nanosheet was produced (FIG. 3-2(c)). Observation according to the procedures described in the section entitled "Measurement of Thickness of Silica Nanosheet" revealed that the silica nanosheet has a maximum diameter of 1.00 µm, and a thickness of 8.1 nm (FIG. 4-3).

Reference Example 1

In a 10 mL sample bottle, placed were 0.1 g of the layered silicate obtained in Example 4, and 10 g of pure water, and the mixture was allowed to stand at room temperature for 24 hours. Proportion of the layered silicate in this process was 1 part by mass per 100 parts by mass of pure water. A part of the supernatant after the standing was sampled and observed under a transmission electron microscope to reveal that a silica nanosheet was not produced.

Reference Example 2

In a 10 mL sample bottle, placed were 0.1 g of the layered silicate obtained in Example 5, and 10 g of pure water, and the mixture was allowed to stand at room temperature for 24 hours. Proportion of the layered silicate in this process was 1 part by mass per 100 parts by mass of pure water. A part of the supernatant after the standing was sampled and observed under a transmission electron microscope to reveal that a silica nanosheet was not produced.

Example 10

In a 10 mL sample bottle, placed were 0.1 g of the layered silicate obtained in Example 6, and 10 g of pure water, and the mixture was allowed to stand at room temperature for 24 hours. Proportion of the layered silicate in this process was 1 part by mass per 100 parts by mass of pure water. A part of the supernatant after the standing was sampled and observed under a transmission electron microscope to presume that a silica nanosheet was produced (FIG. 3-2(d)). Observation according to the procedures described in the section entitled "Measurement of Thickness of Silica Nanosheet" revealed that the silica nanosheet had a maximum diameter of 2.16 µm, and a thickness of 6.1 nm (FIG. 4-4).

TABLE 1

|  | Example 1 | Example 2 | Example 3 | Example 4 | Example 5 | Example 6 | Comparative Example 1 |
|---|---|---|---|---|---|---|---|
| Cage silicate | Synthesis Example 1 | Synthesis Example 1 | Synthesis Example 1 | Synthesis Example 1 | Synthesis Example 1 | Synthesis Example 1 | Synthesis Example 2 |
| Quaternary ammonium | Ethyltrimethyl-ammonium hydroxide | Ethyltrimethyl-ammonium hydroxide | Ethyltrimethyl-ammonium hydroxide | Ethyltrimethyl-ammonium hydroxide | Ethyltrimethyl-ammonium hydroxide | Ethyltrimethyl-ammonium hydroxide | Cetyltrimethyl-ammonium hydroxide |
| Base/$SiO_2$ (mole ratio) | 0.9 | 0.9 | 0.9 | 0.9 | 0.9 | 0.9 | 0.6 |
| $H_2O/SiO_2$ (mole ratio) Step (a) | 12.8 | 12.8 | 12.8 | 12.8 | 12.8 | 12.8 | 4.4 |
| Drying conditions Cage silicate after step (a) | 60° C. × 1 Hr | 60° C. × 2 Hr | 60° C. × 3 Hr | 60° C. × 4 Hr | 60° C. × 5 Hr | 60° C. × 6 Hr | None |
| Water/$SiO_2$ (mole ratio) Step (b) | 10.7 | 8.8 | 5.9 | 4.5 | 3.7 | 3.5 | 4.4 |
| Autoclave treatment conditions After step (b) | 150° C. × 13 days | 150° C. × 13 days | 150° C. × 13 days | 150° C. × 13 days | 150° C. × 13 days | 150° C. × 13 days | 150° C. × 13 days |
| Layered silicate formation | Yes | Yes | Yes | Yes | Yes | Yes | Not formed |
| Crystal structure | Layered silicate A | Layered silicate A | Layered silicate A ULS-1 | ULS-1 | ULS-1 | Layered silicate A | — |
| Nanosheet production method | Example 7 | Example 8 | Example 9 | Reference Example 1 | Reference Example 2 | Example 10 | — |
| Aqueous medium | Pure water | Pure water | Pure water | Pure water | Pure water | Pure water | — |
| Layered silicate/medium (% by mass) | 1 | 1 | 1 | 1 | 1 | 1 | — |
| Swelling power (mL/g) | 22 | 40 | 20 | Not swelled | Not swelled | 11 | — |
| Nanosheet formation | Yes | Yes | Yes | No | No | Yes | — |

INDUSTRIAL APPLICABILITY

The method of producing a layered silicate of the present invention accomplishes a remarkable technical effect of enabling easy production of the layered silicate in a short time, which is highly valuable in practice, and the layered silicate produced by this method is highly valuable as a raw material for silica nanosheet and so on. Hence, the present invention has high applicability in a variety of industrial fields that involves production, utilization and so on of layered silicate or silica nanosheet, including manufacturing industries, such as chemical industry, daily necessities industry, and cosmetics industry.

The invention claimed is:

1. A method of producing a layered silicate, the method comprising steps (a) and (b) below:
  (a) providing a cage silicate that contains an anion component represented by formula (1) below and a cation component represented by formula (2) below with a ratio of the mole number of water to the mole number of the anion component in terms of Sift, ($H_2O/SiO_2$), of 0.7 to 30;

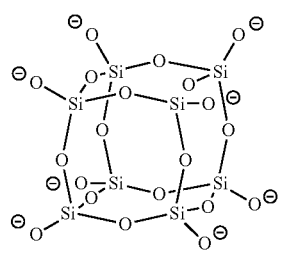

formula (1)

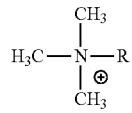

formula (2)

wherein in formula (2), R represents an alkyl group having 2 to 9 carbon atoms; and
  (b) treating the cage silicate obtained in step (a) in an autoclave.

2. The method of producing a layered silicate according to claim 1, wherein the ratio of the mole number of water to the mole number of the anion component in terms of $SiO_2$, ($H_2O/SiO_2$), in the cage silicate provided in step (a) is 1.5 to 15.0.

3. The method of producing a layered silicate according to claim 1, wherein, in step (a), the cage silicate is kept under vacuum or reduced pressure at a temperature of 20° C. or higher and lower than 80° C. for 30 minutes or longer and 10 hours or shorter to remove water.

4. The method of producing a layered silicate according to claim 1, wherein the ratio of the mole number of the cation component represented by formula (2) in terms of quaternary ammonium to the mole number of the anion component in terms of $SiO_2$, (quaternary ammonium/$SiO_2$), in the cage silicate provided in step (a) is 0.7 to 1.5.

5. The method of producing a layered silicate according to claim 1, wherein the treatment in the autoclave in step (b) takes place in a pressure vessel at a temperature of 80° C. or higher and lower than 300° C.

6. The method of producing a layered silicate according to claim 1, further comprising step (c) below prior to step (a):
  (c) mixing activated silicic acid and a quaternary ammonium to crystallize a cage silicate from the mixed solution.

7. The method of producing a layered silicate according to claim 6, wherein the activated silicic acid is obtained by removing a cation from an alkali silicate solution obtained by dissolving an anhydrous alkali silicate.

8. A method of producing a silica nanosheet, the method comprising contacting the layered silicate obtained by the production method according to claim 1 with a hydrophilic medium.

9. The method of producing a silica nanosheet according to claim 8, wherein the contacting is carried out at a ratio of 0.1 parts by mass to 15 parts by mass of the layered silicate to 100 parts by mass of the hydrophilic medium.

10. The method of producing a silica nanosheet according to claim 8, wherein the hydrophilic medium is water, an organic solvent, or a mixture thereof.

11. A method of producing a silica nanosheet dispersion, the method comprising contacting the layered silicate obtained by the production method according to claim 1 with a hydrophilic medium.

12. The method of producing a layered silicate according to claim 2, wherein, in step (a), the cage silicate is kept under vacuum or reduced pressure at a temperature of 20° C. or higher and lower than 80° C. for 30 minutes or longer and 10 hours or shorter to remove water.

13. The method of producing a layered silicate according to claim 2, wherein the ratio of the mole number of the cation component represented by formula (2) in terms of quaternary ammonium to the mole number of the anion component in terms of $SiO_2$, (quaternary ammonium/$SiO_2$), in the cage silicate provided in step (a) is 0.7 to 1.5.

14. The method of producing a layered silicate according to claim 2, wherein the treatment in the autoclave in step (b) takes place in a pressure vessel at a temperature of 80° C. or higher and lower than 300° C.

15. The method of producing a layered silicate according to claim 2, further comprising step (c) below prior to step (a):
(c) mixing activated silicic acid and a quaternary ammonium to crystallize a cage silicate from the mixed solution.

16. The method of producing a layered silicate according to claim 15, wherein the activated silicic acid is obtained by removing a cation from an alkali silicate solution obtained by dissolving an anhydrous alkali silicate.

17. A method of producing a silica nanosheet, the method comprising contacting the layered silicate obtained by the production method according to claim 2 with a hydrophilic medium.

18. The method of producing a silica nanosheet according to claim 17, wherein the contacting is carried out at a ratio of 0.1 parts by mass to 15 parts by mass of the layered silicate to 100 parts by mass of the hydrophilic medium.

19. The method of producing a silica nanosheet according to claim 17, wherein the hydrophilic medium is water, an organic solvent, or a mixture thereof.

20. A method of producing a silica nanosheet dispersion, the method comprising contacting the layered silicate obtained by the production method according to claim 2 with a hydrophilic medium.

* * * * *